L. BILLÉ.
JOINT FOR CONDUITS AND THE LIKE.
APPLICATION FILED AUG. 29, 1910.
1,016,124.
Patented Jan. 30, 1912.
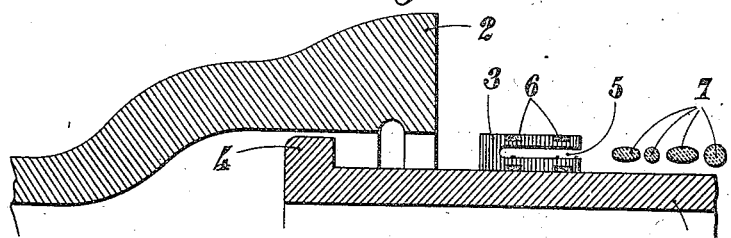
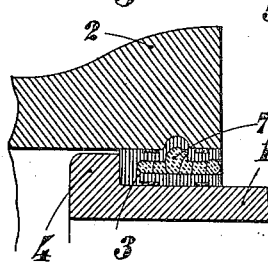
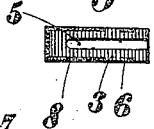
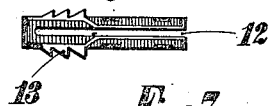
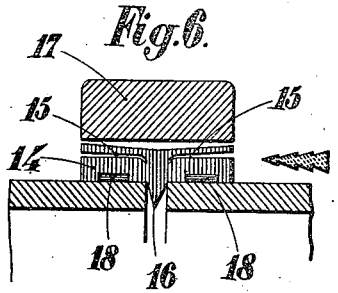
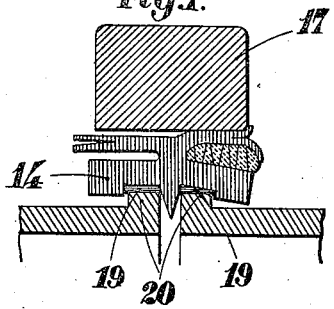
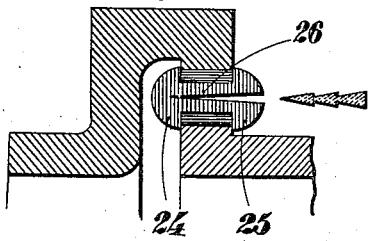
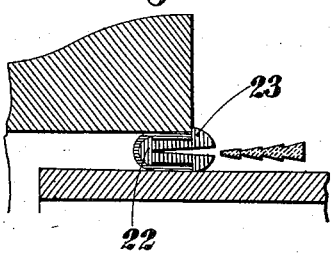
Witnesses.
Inventor.
Leon Billé.
By

UNITED STATES PATENT OFFICE.

LÉON BILLÉ, OF NOGENT-SUR-MARNE, FRANCE.

JOINT FOR CONDUITS AND THE LIKE.

1,016,124.   Specification of Letters Patent.   Patented Jan. 30, 1912.

Application filed August 29, 1910. Serial No. 579,378.

*To all whom it may concern:*

Be it known that I, LÉON BILLÉ, a citizen of the French Republic, residing at Nogent-sur-Marne, Department of the Seine, in France, have invented certain new and useful Improvements in and Relating to Joints for Conduits and the Like, of which the following is a specification.

The present invention relates to pipe joints, and more especially to pipe joints of the socket type.

It comprehends an improved method of forming such joints, and, also, an improved sealing collar for use in carrying out that method.

In the accompanying drawing, Figures 1 and 2 are fragmental longitudinal sectional views of a socket joint embodying the invention. These figures show the sealing collar in its simplest form, and also show the filling devices employed in conjunction therewith. Fig. 3 is a transverse sectional view of a modified form of collar. Figs. 4 and 5 are similar views of that form of sealing collar which is preferably used, the lining collar shown in Fig. 5 being a slight modification of that shown in Fig. 4. Figs. 6 to 9 are sectional views of further modifications of the invention.

Referring to said drawing, and more particularly to Figs. 1 to 5, 1 and 2 indicate, in a general manner, the two pipes to be coupled together, and 4 a stop which, in the present instance, is provided upon the inner pipe 1 and is shown as in the form of a bead. Between said pipes there is forced a malleable metal collar 3, which is U-shaped in cross-section, the space 5 between its walls being designed to receive malleable metal filling devices 7, here shown as in the form of rings. These rings present the same curvature as the collar, and they are driven in the space 5 and upset, so as to expand said walls and press them against the walls of the pipes, to the form of which they adapt themselves perfectly. The outer surfaces of the collar walls may, if desired, be provided with rubber rings 6, which are fitted in grooves formed therein, and also, with a cap or cover 8 of rubber or other suitable material, as depicted in Fig. 3, this cap or cover being employed in cases where it is advisable to prevent the liquid or gas conveyed through the pipes from coming into contact with the metal of the joint.

In order to strengthen the joint and to enable it to resist very high pressure, a supplemental collar is provided which is fitted in the space 5 and constitutes a lining for the inner surfaces of the walls of the main or sealing collar 3. This lining collar is also of U-section and its walls are provided with saw teeth. In the form depicted in Fig. 4, the ends of the walls of the lining collar 9 are edged with hard metal rings 10, upon which the teeth 11 are formed, while in the modified form shown in Fig. 5 the lining collar 12 is constructed of very hard but elastic metal and its teeth 13 are formed integral therewith.

To expand the thus-lined sealing collar, it is filled as above described, after which operation wedges of hard metal are driven into the filling material so as to separate its walls and cause the saw teeth to penetrate the pipe walls, but the same effect may be obtained by first separating the collar walls by means of a punch and then driving the filling rings into the space between said walls.

While the preferred form and application of the invention are as hereinabove stated, the sealing collar may be used in connection with joints other than those of the socket type with but slight modification. In such instances, there may be employed a collar 14, Figs. 6 and 7, provided with a groove 15 at each side and with an inner projection 16, against which latter the two pipes bear. A metal muff 17 is then placed on the collar and, by means of a caulking chisel or other suitable tool, the filling material is introduced into said grooves so as to expand the walls thereof. Also, the collar may be turned partly over the muff and partly over the packed filling material, as illustrated in Fig. 7, to prevent any subsequent displacement of the joint. The joint thus formed may be provided with elastic washers 18, which rest directly upon the pipes, (Fig. 6), or with elastic or soft metal washers 19 that rest upon beadings 20 on said pipes, (Fig. 7).

In the construction shown in Fig. 8, the collar 22 is provided with a small flange 23 which serves to prevent its displacement when the space between its walls is being filled, and in Fig. 9 the collar 26 is shown as provided with similar flanges 25 and 26 at its opposite sides which offer great resistance to any longitudinal stresses that may be exerted.

I claim:

1. The method of forming socket pipe joints which consists in forcing a cold malleable metal collar of U-section having the outer surfaces of its walls provided with saw teeth into the socket formed between the confronting ends of the pipe sections, and subsequently forcing a malleable metal filling ring into the space between the walls of said collar, to expand said walls and cause the said teeth to penetrate the adjacent socket walls.

2. The method of forming socket pipe joints which consists in forcing a cold malleable metal collar of U-section having the outer surfaces of its walls provided with washers of elastic material and with saw teeth into the socket formed between the confronting ends of the pipe sections, and subsequently forcing a malleable metal filling ring into the space between the walls of said collar, to expand said walls and cause the said teeth to penetrate the adjacent socket walls.

3. As a new article of manufacture, a malleable metal collar of U-section for sealing pipe joints having the outer surfaces of its walls provided with saw teeth, the space between the walls of said collar being adapted to permanently receive a filler, for expanding said walls, to cause said teeth to penetrate the walls of the pipe sections to be connected.

4. As a new article of manufacture, a malleable metal collar of U-section for sealing pipe joints provided with a lining collar of harder metal having saw teeth connected therewith which are arranged externally of the first-named collar, the space between the walls of said first-named collar being adapted to permanently receive a filler for expanding the same and forcing said teeth to penetrate the walls of the pipe sections to be connected.

In testimony whereof I have hereunto set my hand in presence of two subscribing witnesses.

LÉON BILLÉ.

Witnesses:
H. C. COXE,
GEORGES BOUJE.